United States Patent
Lin

(10) Patent No.: US 6,663,122 B1
(45) Date of Patent: Dec. 16, 2003

(54) STROLLER FRAME

(76) Inventor: Wan-Hsing Lin, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/201,116

(22) Filed: Jul. 18, 2002

(51) Int. Cl.[7] .................................................. B62B 7/00
(52) U.S. Cl. .................. 280/47.38; 280/267; 280/269
(58) Field of Search ................................ 280/267, 647, 280/650, 269, 47.38, 47.41, 47.34

(56) References Cited

U.S. PATENT DOCUMENTS

| | | | | |
|---|---|---|---|---|
| 4,020,914 A | * | 5/1977 | Trautwein | 180/210 |
| 4,527,665 A | * | 7/1985 | Shamie | 188/200 |
| 4,546,997 A | * | 10/1985 | Smyers | 280/5.509 |
| 4,913,452 A | * | 4/1990 | Zun | 280/47.41 |
| 5,103,530 A | * | 4/1992 | Andrisin et al. | 16/20 |
| 5,257,799 A | * | 11/1993 | Cone et al. | 280/642 |
| 5,364,119 A | * | 11/1994 | Leu | 280/647 |
| 5,581,843 A | * | 12/1996 | Purnell | 16/35 R |
| 5,984,332 A | * | 11/1999 | Beaudoin et al. | 280/204 |
| 2003/0122332 A1 | * | 7/2003 | Engels et al. | 280/47.38 |

\* cited by examiner

Primary Examiner—Avraham Lerner

(57) ABSTRACT

A stroller frame has a steering device, two front wheel support rods, and two front wheels. The steering device is disposed on the front wheel support rods. The steering device has a positioning device, a front base seat, a shock absorbing device, and a pair of shock absorbers. The positioning device has two positioning blocks, two sleeves, and a connection bar. The front base seat has two side link devices, a center block, two front protruded blocks, a connection rod, and two lugs. Each lug is disposed on an end of the corresponding side link device. The connection rod is disposed between the lugs. The shock absorbing device is disposed between the connection bar and the center block. Each shock absorber is disposed between the corresponding sleeve and the corresponding front protruded block.

1 Claim, 11 Drawing Sheets

STROLLER FRAME

BACKGROUND OF THE INVENTION

The present invention relates to a stroller frame. More particularly, the present invention relates to a stroller frame which has a steering device to provide a steering effect and a shock absorbing effect for a front wheel.

Referring to FIG. 1, a conventional tricycle stroller frame 1 has a front frame 12, a handle push frame 11, a rear frame 10, two connectors 15, and two base rods 13. Two joints 14 are connected to the front frame 12, the handle push frame 11, and the rear frame 10. A front wheel 131 is supported by the base rods 13. Each connector 15 is connected to the rear frame 10, one of the base rods 13, and a rear wheel 101. However, the front wheel 131 cannot be deflected.

SUMMARY OF THE INVENTION

An object of the present invention is to provide a stroller frame which has a steering device to provide a steering effect for a front wheel.

Another object of the present invention is to provide a stroller frame which has a steering device to provide a shock absorbing effect for a front wheel.

Accordingly, a stroller frame comprises a steering device, two front wheel support rods, and two front wheels. The steering device is disposed on the front wheel support rods. The steering device has a positioning device, a front base seat, a shock absorbing device, and a pair of shock absorbers. The positioning device has two positioning blocks disposed on the front wheel support rods, two sleeves disposed on the positioning blocks, and a connection bar connected to the positioning blocks. A pivot rod fastens the steering device and the front wheel support rods together. The front base seat has two side link devices, a center block, two front protruded blocks, a connection rod, and two lugs. Each of the lugs is disposed on an end of the corresponding side link device. The connection rod is disposed between the lugs. A shaft passes through the front base seat. The shaft is connected to the front wheels. A ball is disposed on a bottom of the front base seat. A tension spring is connected to the connection rod and the ball. The shock absorbing device is disposed between the connection bar and the center block. Each of the shock absorbers is disposed between the corresponding sleeve and the corresponding front protruded block.

DETAILED DESCRIPTION OF THE INVENTION

Figure 1:
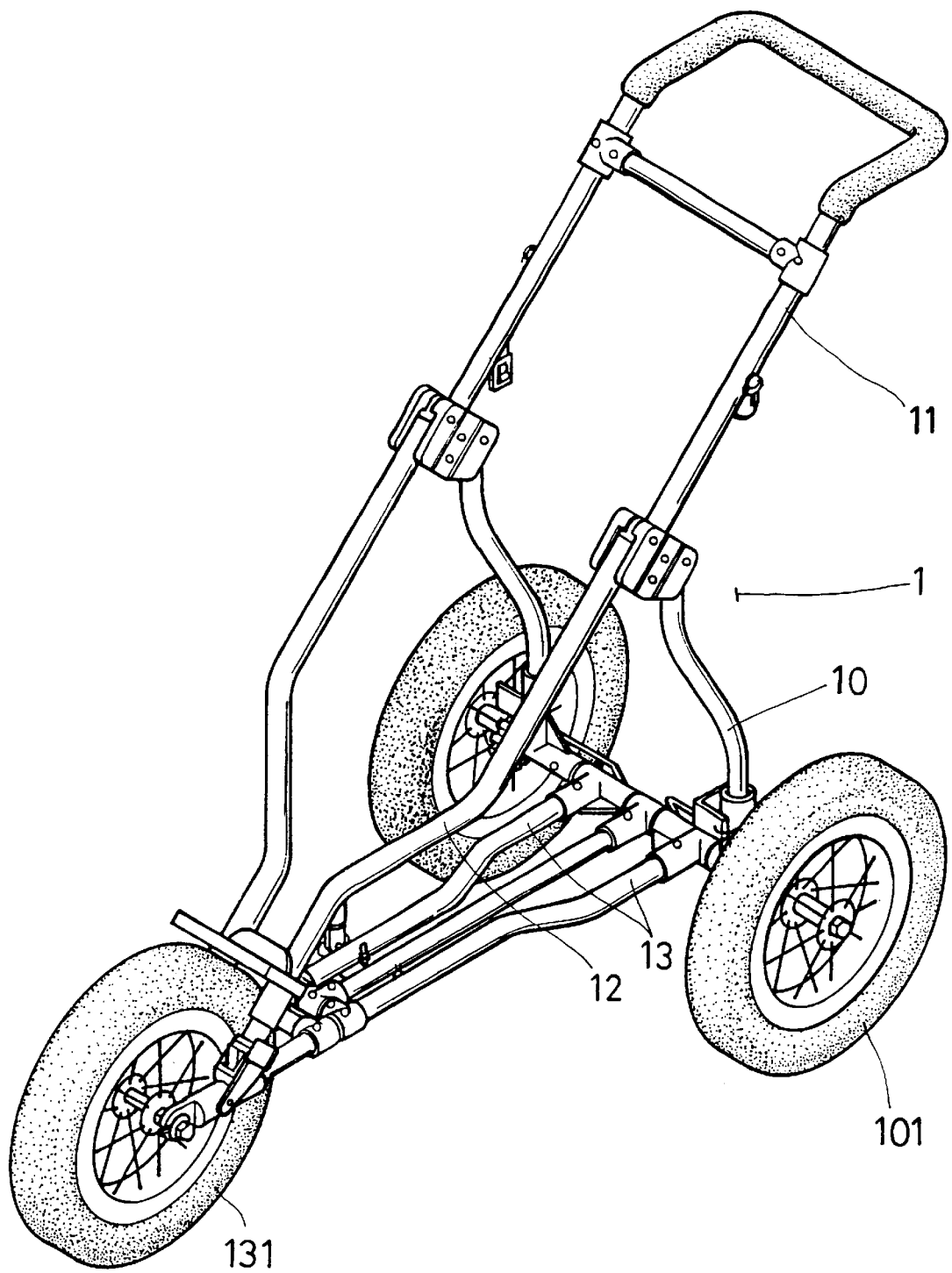
FIG. 1 is a perspective view of a tricycle stroller frame of the prior art.
Figure 2:
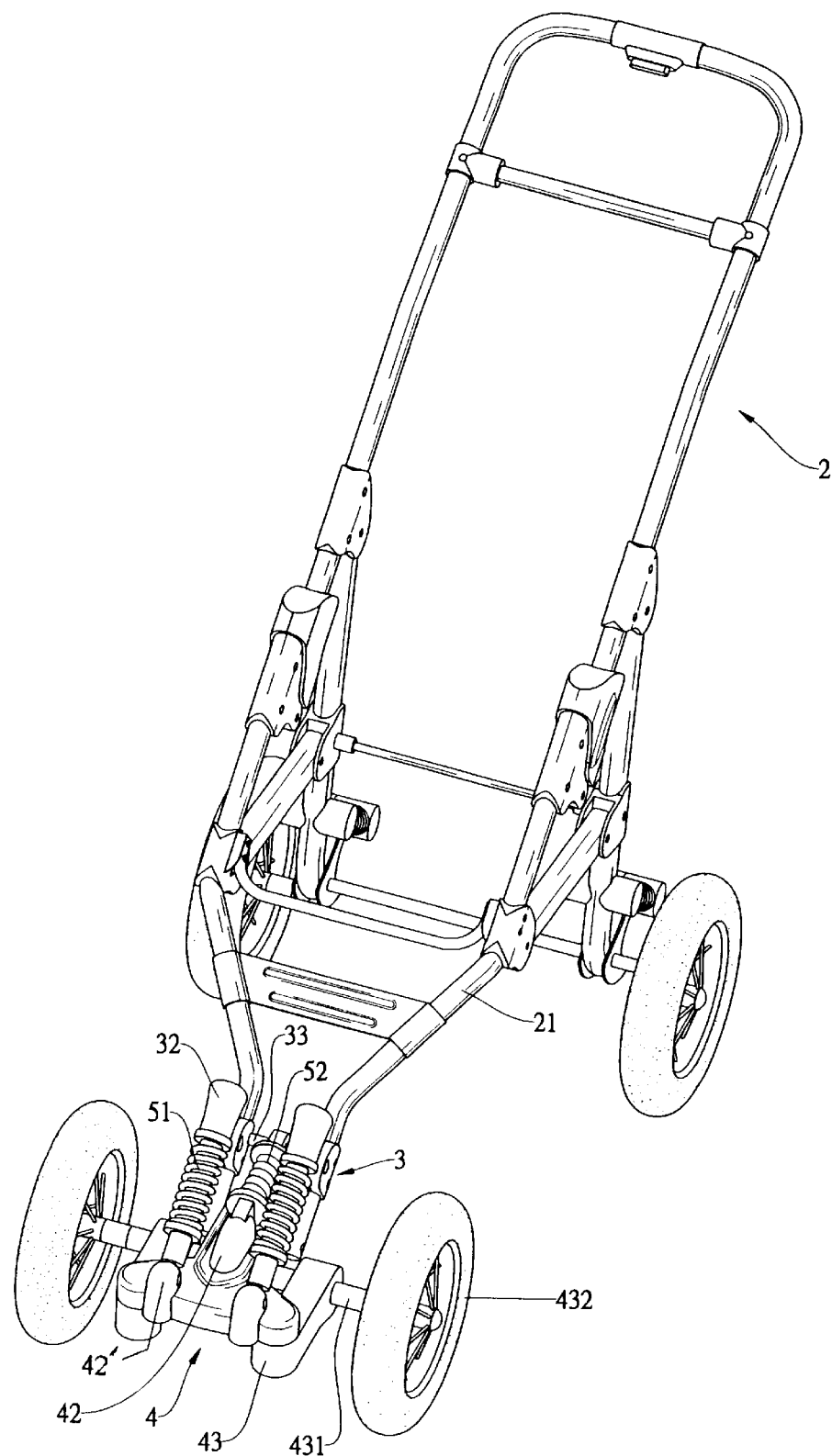
FIG. 2 is a perspective view of a stroller frame of a preferred embodiment in accordance with the present invention.
Figure 3:
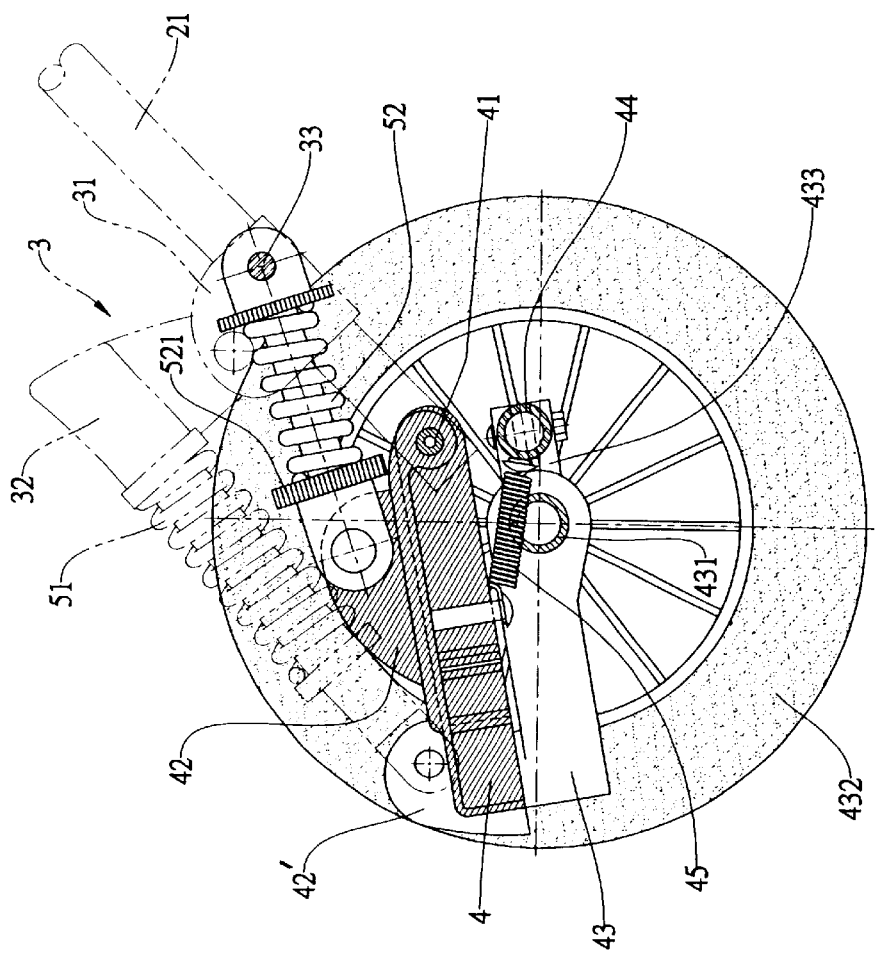
FIG. 3 is an elevational view of a steering device and a front wheel of a preferred embodiment in accordance with the present invention.
Figure 4:
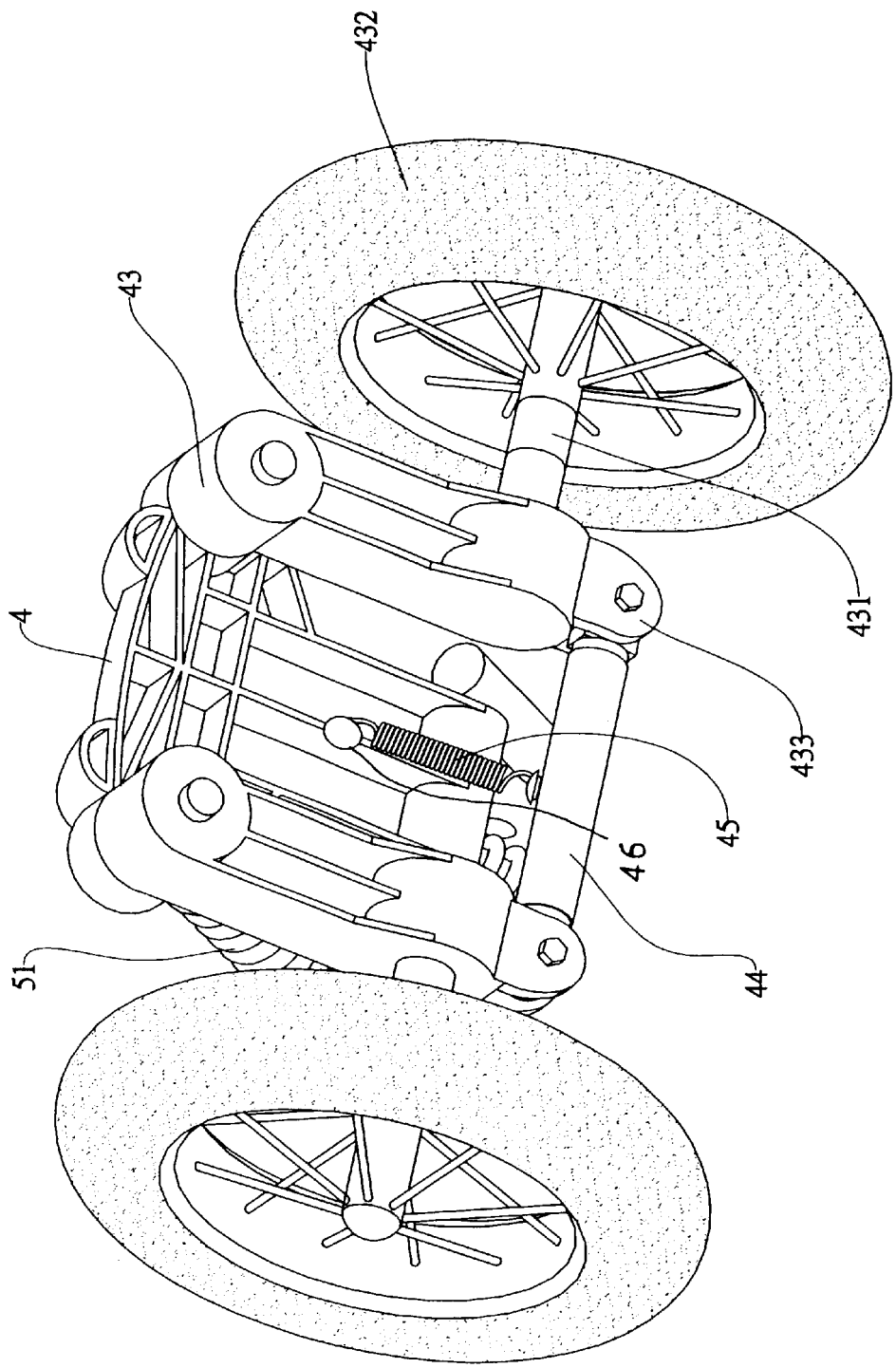
FIG. 4 is a perspective view of a steering device and two front wheels of a preferred embodiment in accordance with the present invention.
Figure 5:
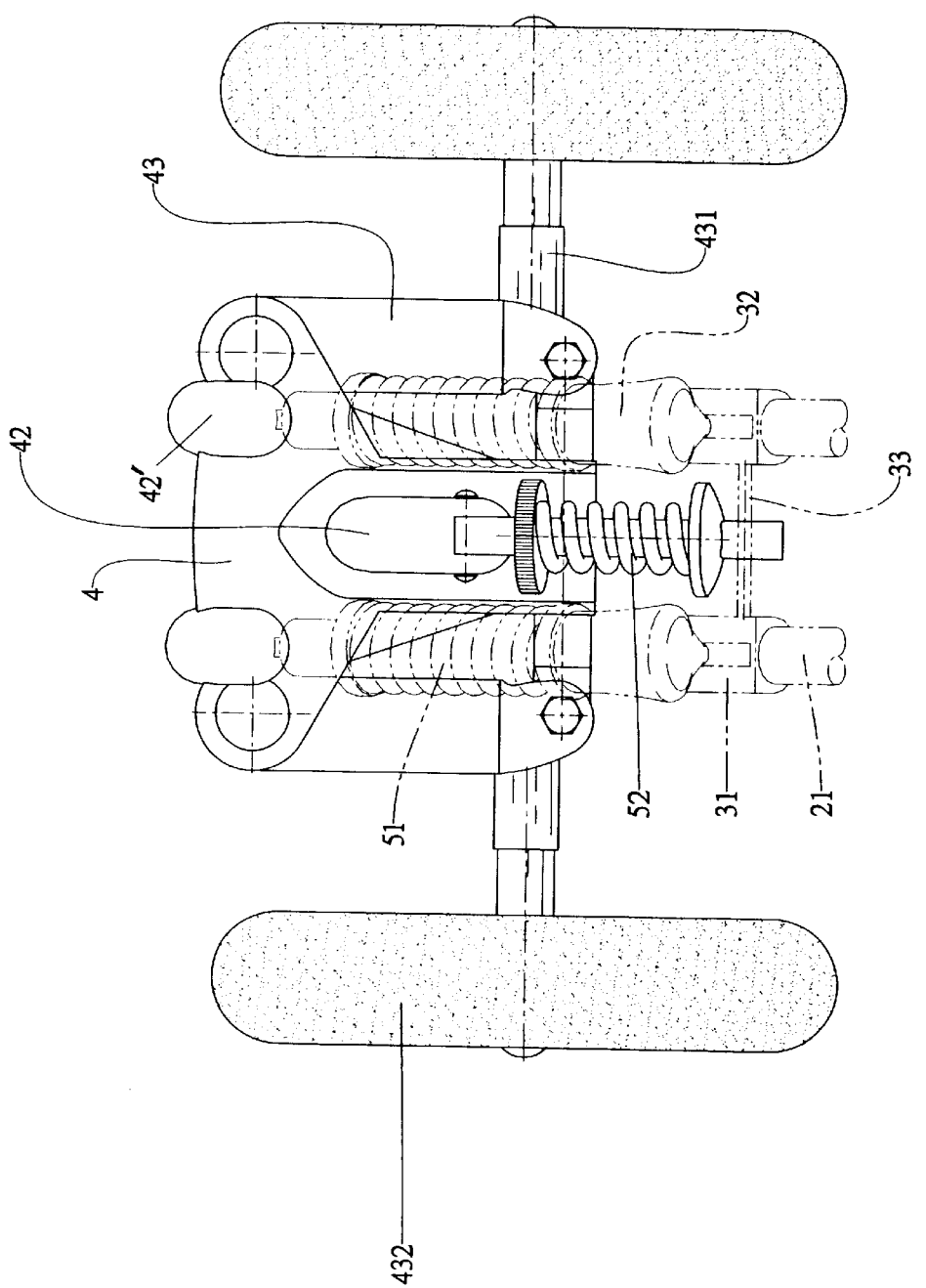
FIG. 5 is a top plan view of a steering device and two front wheels of a preferred embodiment in accordance with the present invention.
Figure 6:
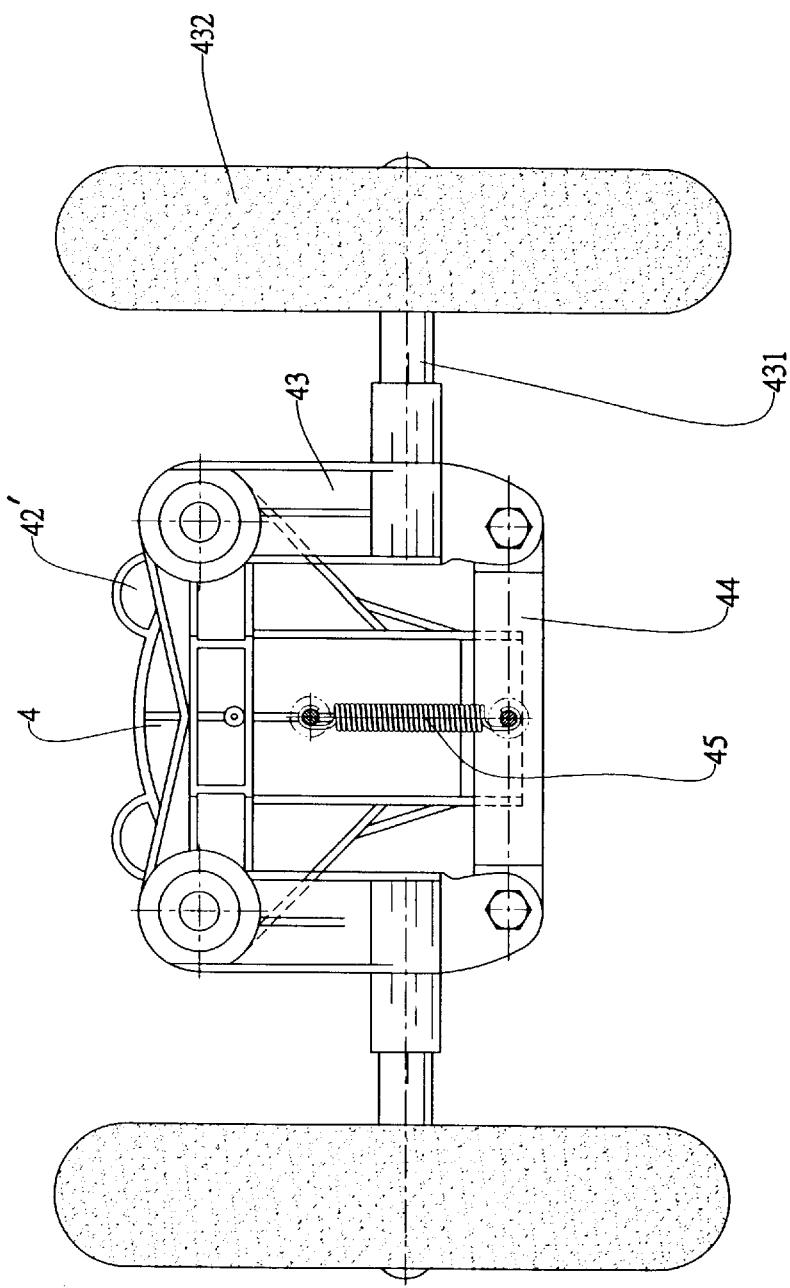
FIG. 6 is a bottom plan view of a steering device and two front wheels of a preferred embodiment in accordance with the present invention.
Figure 7:
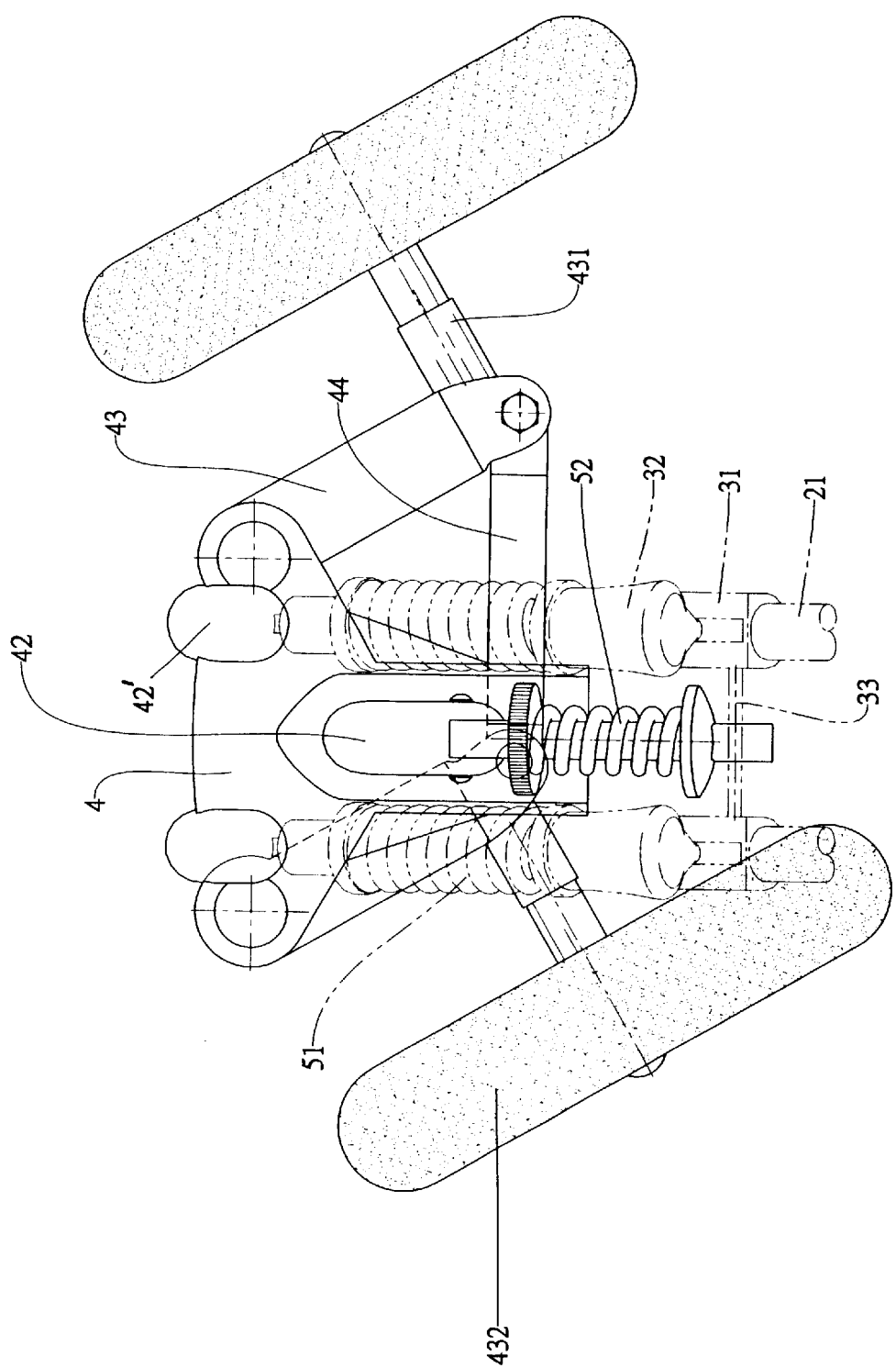
FIG. 7 is a schematic view illustrating a steering operation of two front wheels of a preferred embodiment in accordance with the present invention.
Figure 8:
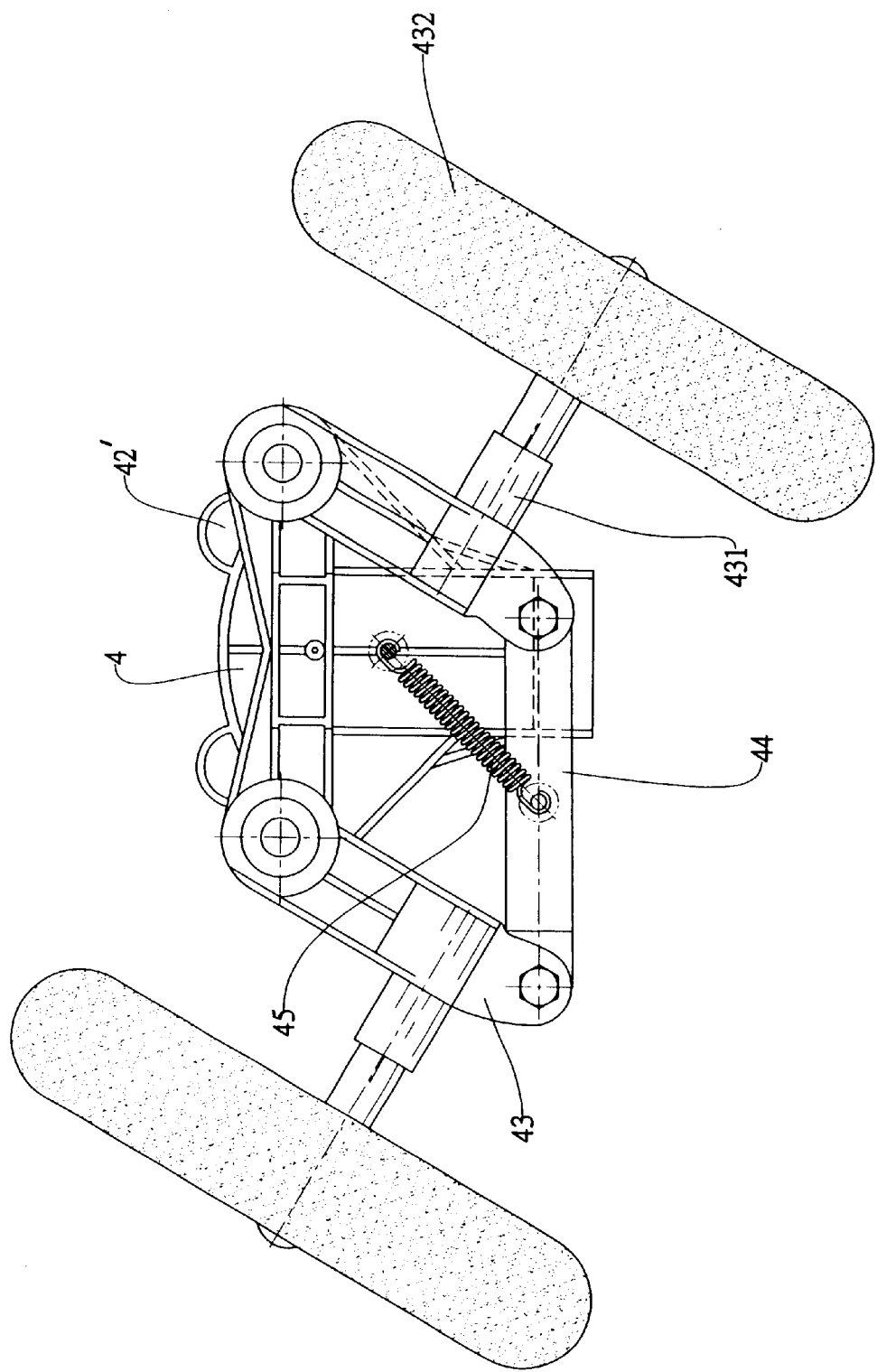
FIG. 8 is a bottom plan view of FIG. 7.
Figure 9:
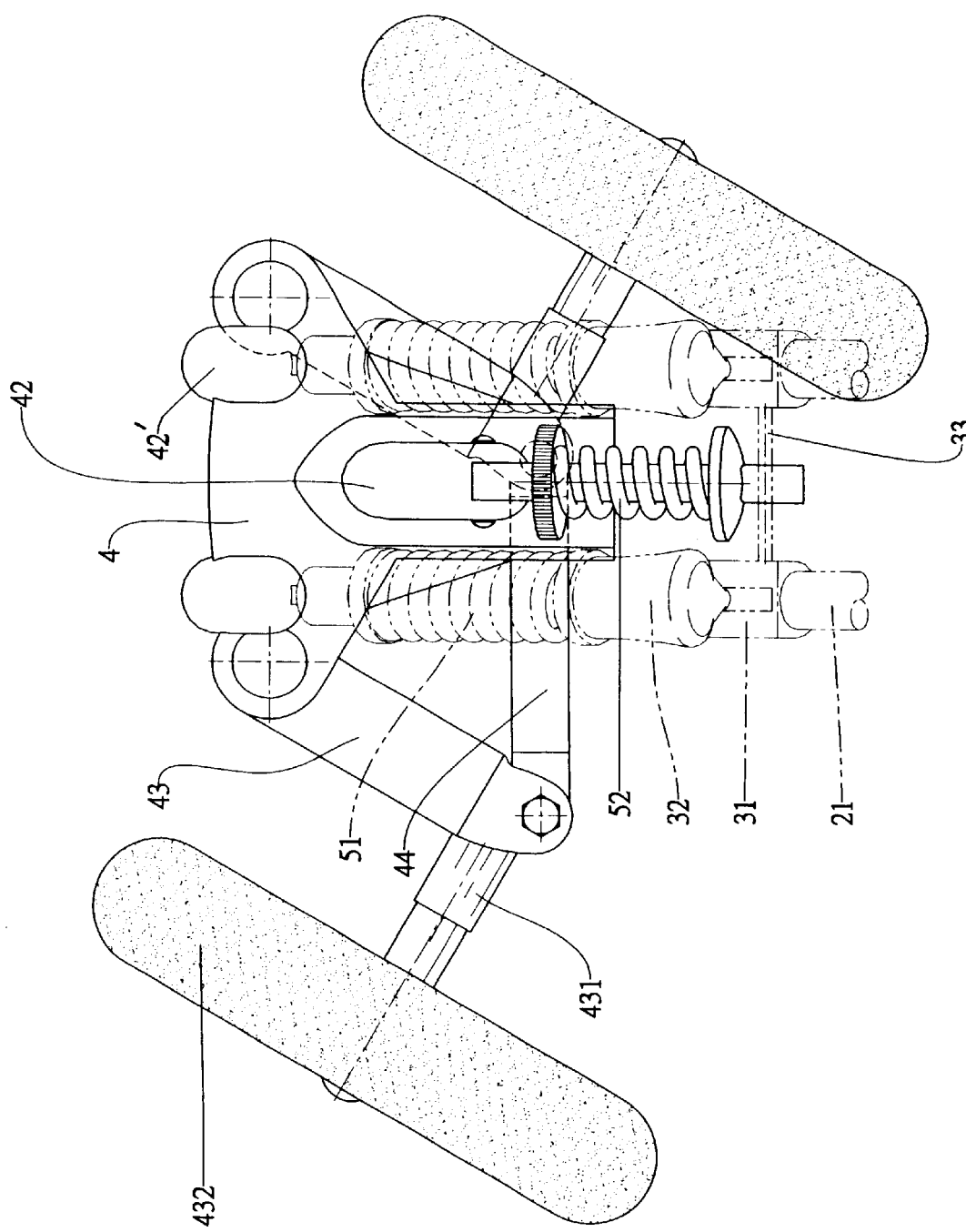
FIG. 9 is a schematic view illustrating another steering operation of two front wheels of a preferred embodiment in accordance with the present invention.
Figure 10:
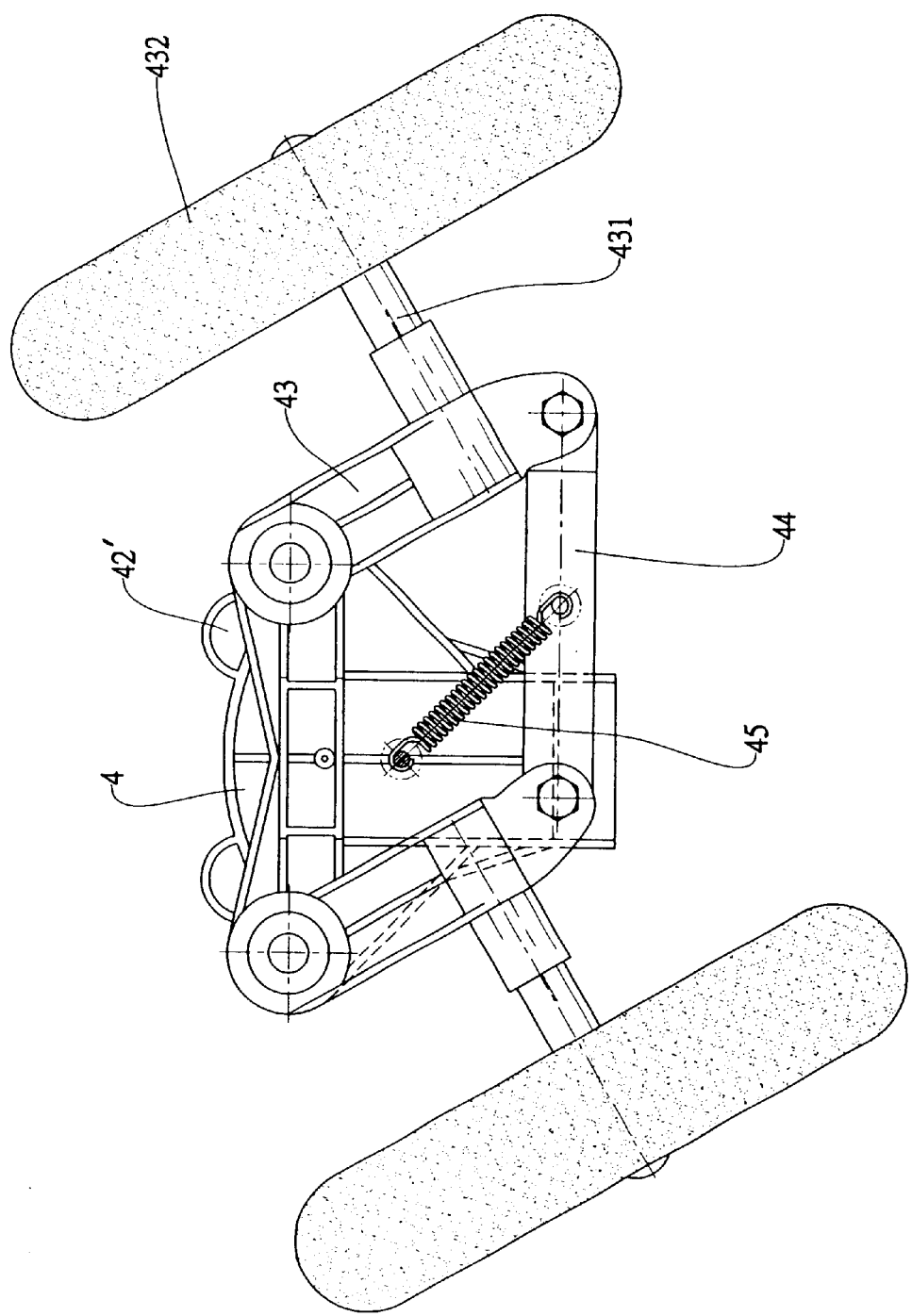
FIG. 10 is a bottom plan view of FIG. 9.

Referring to FIGS. 2 to 11, a stroller frame 2 comprises a steering device, two front wheel support rods 21, and two front wheels 432.

The steering device is disposed on the front wheel support rods 21.

The steering device has a positioning device 3, a front base seat 4, a shock absorbing device 52, and a pair of shock absorbers 51.

The positioning device 3 has two positioning blocks 31 disposed on the front wheel support rods 21, two sleeves 32 disposed on the positioning blocks 31, and a connection bar 33 connected to the positioning blocks 31.

A pivot rod 41 fastens the steering device and the front wheel support rods 21 together.

The front base seat 4 has two side link devices 43, a center block 42, two front protruded blocks 42', a connection rod 44, and two lugs 433.

Each of the lugs 433 is disposed on an end of the corresponding side link device 43.

The connection rod 44 is disposed between the lugs 433.

A shaft 431 passes through the front base seat 4. The shaft 431 is connected to the front wheels 432.

A ball 46 is disposed on a bottom of the front base seat 4.

A tension spring 45 is connected to the connection rod 44 and the ball 46.

The shock absorbing device 52 is disposed between the connection bar 33 and the center block 42.

Each of the shock absorbers 51 is disposed between the corresponding sleeve 32 and the corresponding front protruded block 42'.

Referring to FIGS. 5 and 6 again, the shaft 431 is perpendicular to the front wheels 432.

Referring to FIGS. 7 and 8 again, the side link devices 43 turn left simultaneously while the front wheels 432 turn left. The tension spring 45 is extended. When the tension spring 45 is retracted, the connection rod 44 restores to its original position. The steering device forces the front wheels 432 turn left in parallel.

Referring to FIGS. 9 and 10 again, the side link devices 43 turn right simultaneously while the front wheels 432 turn right. The tension spring 45 is extended. When the tension spring 45 is retracted, the connection rod 44 restores to its original position. The steering device forces the front wheels 432 turn right in parallel.

Figure 11:
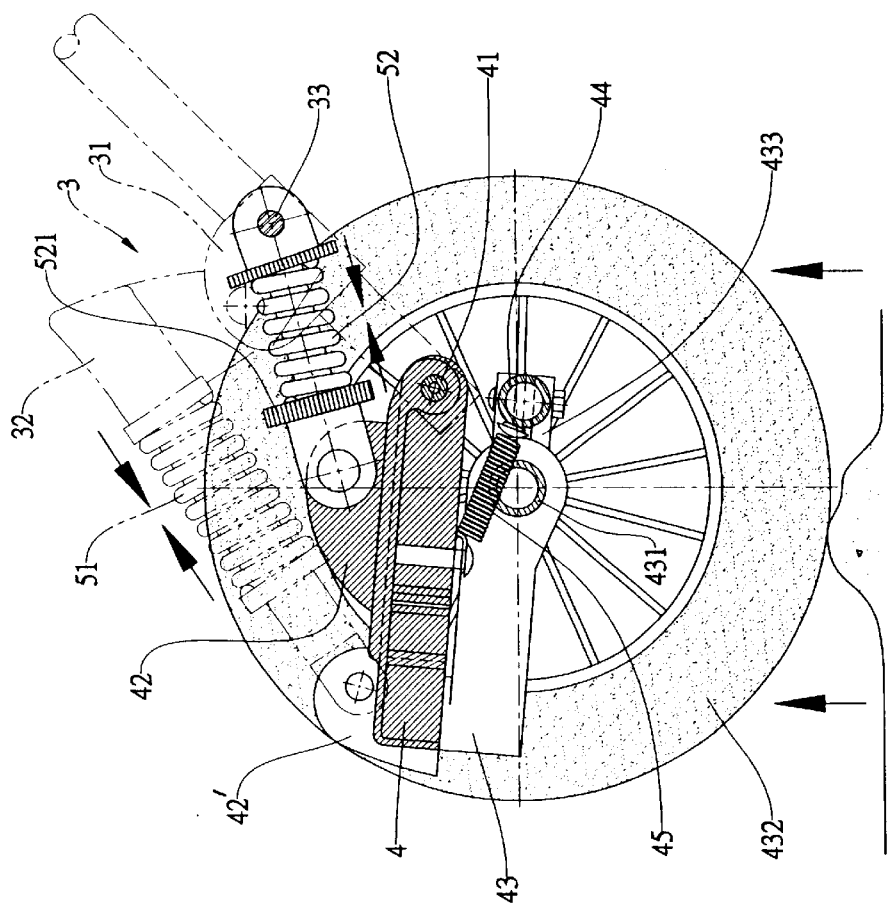
FIG. 11 is a schematic view illustrating a shock absorbing operation of a front wheel of a preferred embodiment in accordance with the present invention.

Referring to FIG. 11, the shock absorbing device 52 will be adjusted to fit different road conditions.

The present invention is not limited to the above embodiment but various modification thereof may be made. Furthermore, various changes in form and detail may be made without departing from the scope of the present invention.

I claim:
1. A stroller frame comprises:

a steering device, two front wheel support rods, and two front wheels, the steering device is disposed on the front wheel support rods, the steering device having a positioning device, a front base seat, a shock absorbing device, and a pair of shock absorbers, the positioning device having two positioning blocks disposed on the front wheel support rods, two sleeves disposed on the positioning blocks, and a connection bar connected to the positioning blocks, a pivot rod fastening the steering device and the front wheel support rods together, the front base seat having two side link devices, a center block, two front protruded blocks, a connection rod, and two lugs, each of the lugs disposed on an end of the corresponding side link device, the connection rod disposed between the lugs, a shaft passing through the front base seat, the shaft connected to the front wheels, a ball disposed on a bottom of the front base seat, a tension spring connected to the connection rod and the ball, the shock absorbing device disposed between the connection bar and the center block, and each of the shock absorbers disposed between the corresponding sleeve and the corresponding front protruded block.

* * * * *